United States Patent [19]

Brocard et al.

[11] Patent Number: 4,817,376
[45] Date of Patent: Apr. 4, 1989

[54] MODULAR SUB-ASSEMBLY FOR TURBINE ENGINE FUEL CONTROL SYSTEMS

[75] Inventors: Jean-Marie Brocard, Rubelles; Eric Perrodeau, Bourg la Reine; Maurice G. Vernochet, Melun, all of France

[73] Assignee: Societe Nationale d'Etude et de Construction de Moteurs d'Aviation "S.N.E.C.M.A.", Paris, France

[21] Appl. No.: 149,364

[22] Filed: Jan. 28, 1988

[30] Foreign Application Priority Data

Jan. 28, 1987 [FR] France .................................. 87 00975

[51] Int. Cl.⁴ .............................................. F02C 9/28
[52] U.S. Cl. .................................................. 60/39.281
[58] Field of Search ............................ 60/39.281, 243

[56] References Cited

U.S. PATENT DOCUMENTS

| | | | |
|---|---|---|---|
| 3,173,468 | 3/1965 | McCombs | 60/39.281 |
| 3,695,038 | 10/1972 | Greiner | 60/39.281 |
| 3,726,086 | 4/1973 | Herbstritt | 60/39.281 |
| 3,913,317 | 10/1975 | Lewis | 60/39.281 |
| 4,337,617 | 7/1982 | Smith | 60/39.281 |
| 4,738,579 | 4/1988 | Agostino et al. | 60/39.281 |

FOREIGN PATENT DOCUMENTS

| | | |
|---|---|---|
| 0107940 | 5/1984 | European Pat. Off. |
| 1144275 | 12/1954 | France |
| 1134891 | 4/1957 | France |
| 2528495 | 12/1983 | France |
| 790007 | 1/1958 | United Kingdom |

Primary Examiner—Louis J. Casaregola
Attorney, Agent, or Firm—Oblon, Fisher, Spivak, McClelland & Maier

[57] ABSTRACT

A modular control sub-assembly in a fuel control system for a turbine engine such as a jet engine, comprises a pressure drop detector constituted by a slide axially movable in a bore of a casing, and an overspeed limiter disposed coaxially in said casing at one end of the bore containing the detector slide. The slide is rotatably driven by the overspeed limiter through a fork coupling and, when the plant overspeed threshold is exceeded, the slide is moved axially by the overspeed limiter in the same direction as on detecting an increase in the pressure drop across a fuel flow feed regulator to reduce an output control pressure signal and thereby cause a control valve to open which reduces the fuel flow and hence the overspeed.

7 Claims, 3 Drawing Sheets

MODULAR SUB-ASSEMBLY FOR TURBINE ENGINE FUEL CONTROL SYSTEMS

BACKGROUND OF THE INVENTION

1. Field of the Invention

The present invention relates to a fuel control system for turbine engines, and in particular to a modular sub-assembly incorporating some of the components of the system.

2. Summary of the prior art

Fuel control systems for turbine plants are known which comprise a flow regulator having its upstream side connected to the output of a proportioning pump and its downstream side to an injection device, a control valve mounted in a by-pass between the pump and the feed regulator, a pressure drop detector intended to provide an output at a modulated pressure Pmod dependent upon the pressure drop Pam-Pav wherein Pam and Pav are the pressures measured upstream and downstream respectively of the flow regulator, the Pmod output acting on the control valve to open or close it when the pressure drop across the flow regulator varies so as to keep the pressure drop substantially constant, an overspeed limiter responsive to the rotational speed of the turbine engine to reduce the injection flow in the user installation when a fixed overspeed threshold is exceeded so as to prevent possible racing of the engine, a stop valve capable of stopping, on command, the flow of fuel injected into the engine, and a control computer for controlling the foregoing components.

In standard control systems the functions of pressure drop detection and overspeed limitation are performed separately by means of independent hydraulic amplifiers constituted by a rotary slide for the pressure drop detector and a servo-valve of the nozzle-vane type for the overspeed limiter. In addition there is a complementary device intended to open the control valve to prevent a burst in the control system when the stop-valve is being closed. Indeed, at that particular moment, the control valve would normally have a tendency to close too, whereas it should be opened widely to by-pass the flow of fuel delivered by the high pressure proportioning pump.

SUMMARY OF THE INVENTION

The present invention aims to integrate within a single modular sub-assembly at least some, and preferably all, of the functions of pressure drop detection across the flow regulator, operation of the control valve, stop operation, and overspeed limitation, so as to increase the reliability of the fuel control system by utilizing a single hydraulic amplifier known for its reliability, for example of the rotating slide type, subjected to forces generated by the pressure drop across the regulator, by the presence or absence of a stop control pressure, and by a system of fly-weights with progressive action, to act on the control valve.

To improve further the reliability of the sub-assembly incorporating these functions the invention preferably also provides the capability of testing its operation when the aircraft fitted with the control system is on the ground, by simulating an overspeed condition which will permit checking whether the slide of the pressure drop detector behaves normally under the action of the overspeed limiter.

According to the invention therefore, there is provided a modular control sub-assembly in a fuel control system for a turbine engine, said fuel control system comprising: a high pressure proportioning pump for providing a supply of fuel at a pressure Pam, a feed flow regulator connected to receive fuel at said supply pressure Pam from said pump and adapted to provide an output flow at a pressure Pav for delivery to a fuel injection system, a pressure drop detector responsive to said supply and delivery pressures Pam and Pav to provide a control pressure signal Pmod dependent on the pressure drop Pam-Pav, a control valve operative on said fuel supply from said pump and responsive to said control pressure signal Pmod to control said fuel supply to said flow regulator so as to maintain said pressure drop Pam-Pav substantially constant, and an overspeed limiter adapted to be rotated by said turbine engine in proportion to the rotational speed of said engine and operative to reduce the flow of fuel to said injection system in response to the speed of said engine exceeding a preset overspeed threshold, wherein said modular control sub-assembly incorporates said pressure drop detector and said overspeed limiter and said sub-assembly comprises: a casing having a bore, a slide mounted for axial and rotational movement in said bore, said slide forming said pressure drop detector, means in said casing housing said overspeed limiter at one end of said bore in coaxial relation to said slide, and coupling means for transmitting the rotational movement of said overspeed limiter to said slide, said overspeed limiter including fly-weight means adapted to act on said slide, when said overspeed threshold is exceeded, to move said slide axially in the same direction as said slide moves when detecting an increase in said pressure drop Pam-Pav to reduce said control pressure signal Pmod and cause said control valve to open and reduce said fuel supply to said flow regulator.

Preferably the pressure drop detector slide includes a piston defining with said casing first and second control chambers communicating respectively with said pressures Pam and Pav, means defining with said casing first and second working chambers communicating respectively with said high pressure Pam and a low pressure Pca, and a shoulder separating said first and second working chambers, and said casing includes an outlet for said control pressure signal Pmod, said shoulder cooperating with said outlet to communicate said outlet with either said first working chamber at said pressure Pam or said second working chamber at said pressure Pca to produce said control pressure signal Pmod when said slide moves axially in response to a decrease or increase, respectively, in the pressure drop Pam-Pav detected by said first and second control chambers, and adjustable resilient stop means against which said slide moves axially when said pressure drop increases.

With this construction, the casing preferably defines first and second end chambers receiving opposite ends of said slide, said first end chamber housing said resilient stop means, and said second end chamber housing said fly-weight means of said overspeed limiter and said rotary coupling means between said overspeed limiter and said slide, and said slide includes means defining, with said casing, an intermediate chamber, an axial passage opening at opposite ends into said first and second end chambers, and radial passages communicating said axial passage with said second working chamber and said intermediate chamber, said slide being hydraulically balanced when said slide is at rest between said first and second end chambers and said low pressure Pca is communicated to said second working chamber and said intermediate chamber and hence to said first and second end chambers via said axial and radial passages.

Preferably the casing has a further bore disposed on the opposite side of said second end chamber from said pressure drop detector slide and coaxial therewith, and said overspeed limiter comprises a bushing disposed in said further bore, and a plug slidable in said bushing and facing the end of said slide in said second end chamber, said bushing supporting gearing adapted to be driven by a shaft of said turbine plant and said fly-weight means in said second end chamber, and said fly-weight means including a support member carried by said bushing and having a fork forming part of said coupling means for rotating said slide, and levers attached to said fly-weights and operative to cause displacement of said plug towards said slide when the speed of said turbine engine increases whereby, when said overspeed threshold is reached, said plug engages and pushes said slide axially in a direction which reduces said control pressure signal Pmod to open said control valve and thereby limit the overspeed.

DESCRIPTION OF THE PREFERRED EMBODIMENT

Figure 1:
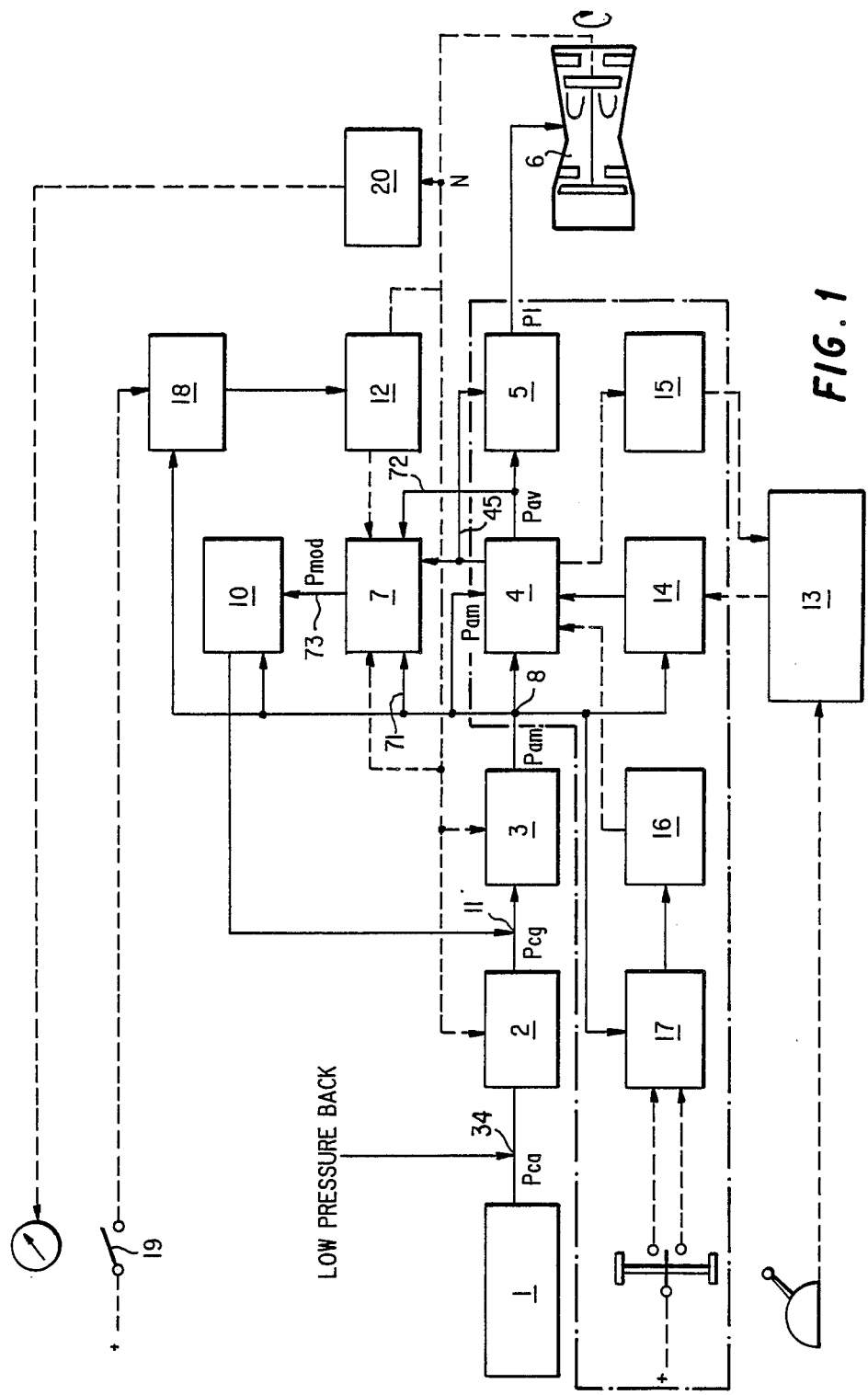
FIG. 1 is a block diagram of a fuel control system incorporating a sub-assembly in accordance with the invention. In this diagram hydraulic connections are shown by continuous lines, mechanical connections by short dashed lines, and electrical connections by long dashed lines.

FIG. 1 shows a block diagram of the fuel control system of a turbine engine The installation comprises a high pressure pump 3 supplied with fuel from a tank 1 by a centrifugal low pressure pump 2. The pump 3 is of the proportioning type and delivers a flow of fuel proportional to the operation of the turbine engine to a flow regulator 4 which, through a valve 5 (referred to hereafter as a stop valve), supplies the main fuel injection system for the combustion chamber of the engine 6.

A pressure drop detector 7 receives at two inlets 71 and 72 the pressure Pam, taken at a point 8 situated between the high pressure pump 3 and the flow regulator 4, and the pressure Pav taken downstream of the regulator 4. Under the action of fuel at pressure Pam taken at point 8, the detector 7 provides at its outlet 73 a pressure Pmod which controls the opening or closing of a control valve 10 having an input connected to the point 8 at pressure Pam, and an output connected upstream to a point 11 in the pipe connecting the low pressure pump 2 and the high pressure pump 3.

The control valve 10 operates in response to the detection of a variation of the pressure drop Pam-Pav across the flow regulator to by-pass the excess fuel which is situated between the high pressure pump 3 and the regulator 4 so as to keep constant the pressure drop across the regulator. This is a condition for the fuel flow supplied to the injectors, which is proportional to the flow passage cross-section of the regulator and to the square root of the pressure drop, to be a function only of the displacement of the regulator piston.

An overspeed limiter 12, which is driven by the turbine engine and thus receives input information on the rotational speed N of the plant, is operative to reduce the flow in the injection system of the turbine engine 6 when an overspeed threshold is reached so as to keep the engine at a tolerable speed. To do so, the overspeed limiter has a bushing disposed in a bore coaxial with a slide of the pressure drop detector 7 which it drives in rotation and on which it is able, on exceeding the overspeed threshold, to act in the same direction as when an increase of the pressure drop is detected by the detector 7 to reduce the pressure Pmod at the output of the detector. The effect of this is to open the control valve 10 quickly, and thus reduce the flow to the receiver installation 6, thereby preventing the operating rate from increasing further and avoiding the destruction of the engine.

The fuel regulator 4 comprises a differential piston which is displaceable linearly by means of a control computer 13 which acts on one or more servo valves 14 to modify the pressures in control chambers of the regulator, while the position of the piston is measured by one or more displacement detectors 15 which transmit the position data to the computer 13.

The displacement of the regulator piston towards its minimum flow position is limited by a safety stop 16 which can be retracted by actuation of a solenoid valve 17 to enable the regulator 4 to assume a position of closure or of nil outflow, in which position an annular chamber of the regulator permits a control pressure Pam taken at point 8 to be supplied to the stop valve 5 in order to close the valve 5 and cut off the injection system.

Figure 2:
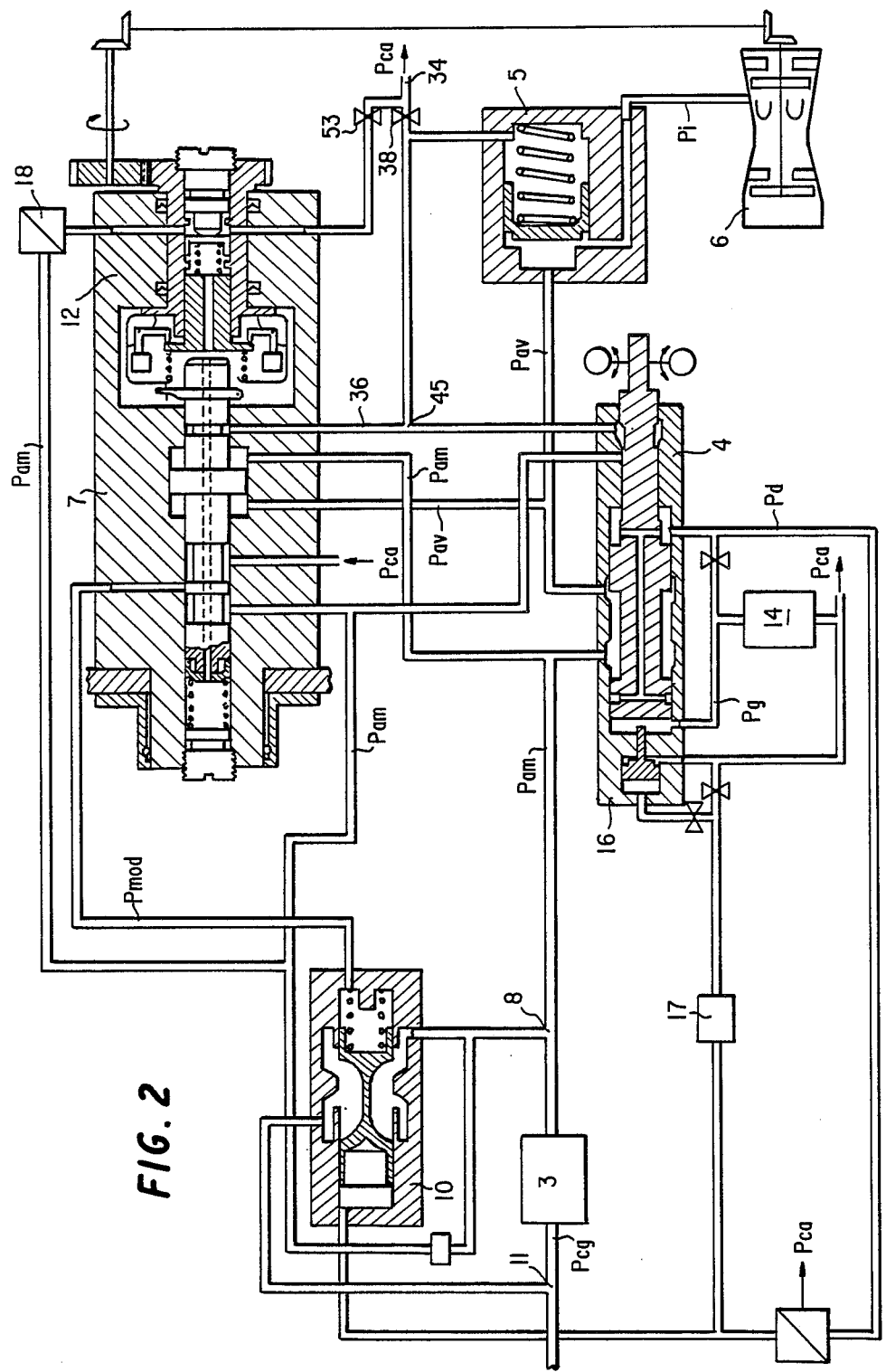
FIG. 2 shows a practical embodiment of the control system.
Figure 3:
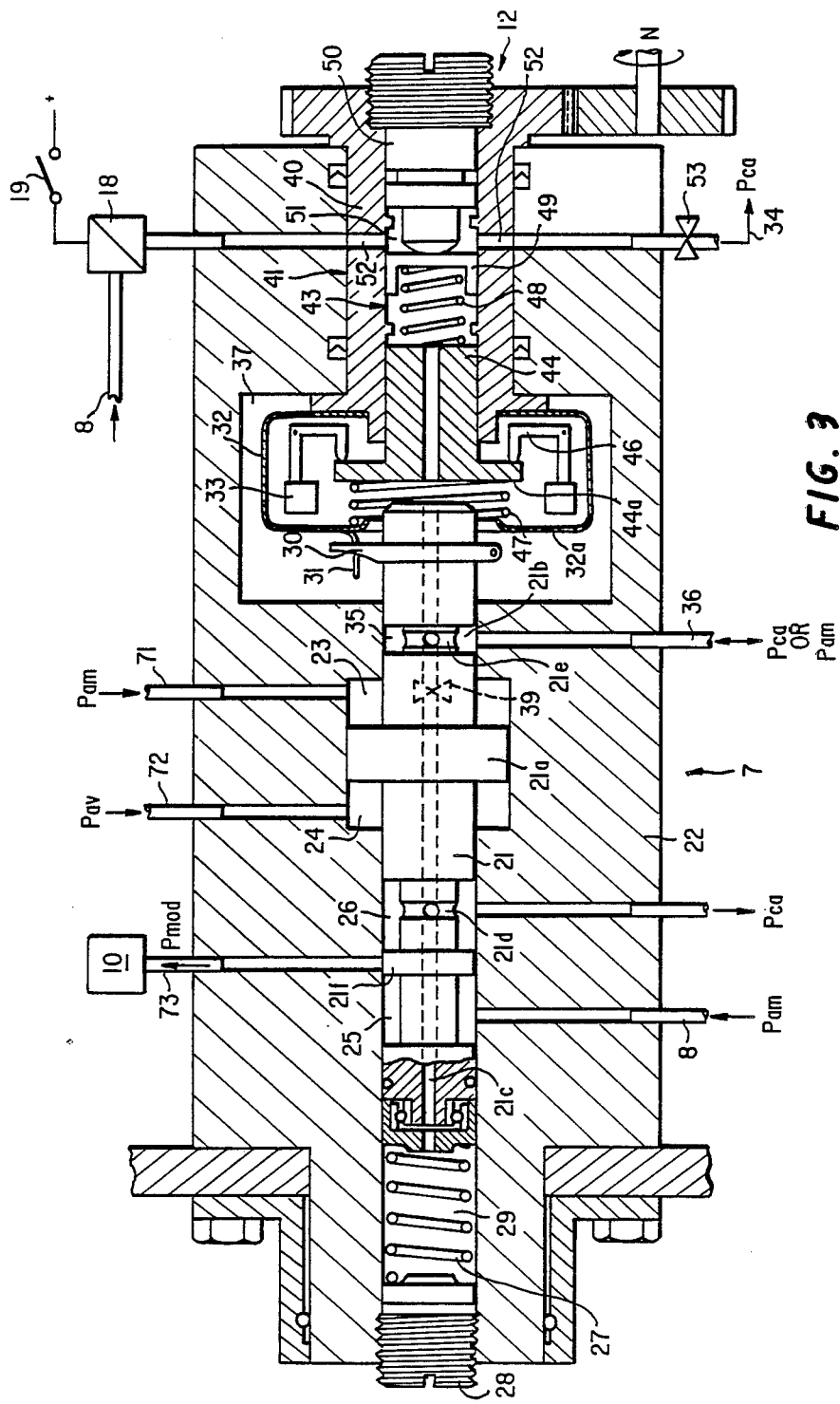
FIG. 3 shows, to a larger scale, the modular sub-assembly in accordance with the invention of the control system shown in FIG. 2.

Reference will now be made to FIGS. 2 and 3 for further description of the control system and some of its components, the same reference numerals being used for identical elements.

Referring particularly to FIG. 3 it will be seen that the pressure drop detector 7 consists of a slide 21 movable linearly and rotationally in a bore of a casing 22 and having a piston 21a defining, together with the casing 22, two control chambers of which one 23 is connected to the inlet 71 to receive the pressure Pam and the other 24 is connected to the inlet 72 to receive the pressure Pav. The slide 21 also defines with the casing 22 two working chambers, one 25 arranged to receive the pressure Pam and the other 26 in communication with the low pressure Pca, separated by a shoulder 21f which, through the linear movement of the slide, controls communication between the outlet 73 and either the first working chamber 25 at the pressure Pam or the second working chamber 26 at the pressure Pca to provide the output control pressure Pmod in response to a decrease or an increase, respectively, of the pressure drop Pam-Pav. The displacement of the slide 21 when the pressure drop increases takes place against an elastic stop comprising a spring 27 which is disposed in a first slide end chamber 29 situated in the casing at the left in FIG. 3 and which is adjustable by means of a screw 28.

At its other end the slide 21 extends into a second slide end chamber 37 in the casing 22 and carries a finger 30 by which the slide is rotated by a fork 31 carried by a member 32 of the overspeed limiter 12 which also carries the fly-weight system in the chamber 37.

Between the control chamber 23 receiving fuel at the high pressure Pam and the second slide end chamber 37 the slide 21 has an annular groove 21b which forms with the casing 22 an intermediate chamber 35 connected by a duct 36, on the one hand through a throttle 38 to a return pipe leading to the low pressure Pca at a point 34 situated upstream of the pump 2 (see FIG. 1) and on the other hand to an output 45 of the feed regulator 4 which is communicable with the high pressure Pam when the regulator piston approaches the position of nil output flow.

An axial channel 21c extending right through the slide 21, and radial ducts 21d,21e, opening therefrom into the chambers 26 and 35 respectively, permit, in the absence of the high pressure Pam in the chamber 35, hydraulic balancing of the slide 21 so that only variations of Pam and Pav in the control chambers 23,24 leading to a change in pressure drop Pam-Pav control the displacement of the slide 21. On the other hand, when the pressure Pam is applied to the chamber 35, a throttle 39 situated between the chambers 26 and 35 prevents fuel at the pressure Pam from entering the chamber 26, while allowing it to pass to the second slide end chamber 37 to ensure displacement of the slide 21 leftwards in FIGS. 2 and 3.

The overspeed limiter comprises a bushing 40 disposed in a bore 41 in the casing 22 coaxial with the slide 21 add situated on the other side of the second slide end chamber 37. The bushing 40 is rotatably driven by gearing 42 which is itself driven through a step-down gear by the turbine engine so that the bushing 40 rotates at a speed proportional to the speed N of the turbine engine.

The bushing 40 has a through bore 43 in which a flanged plug 44 is slidable under the action of the levers 46 of the fly-weight system 33 in the chamber 37 and an opposing spring 47 disposed between a part 32a of the fly-weight support 32 and a bearing face 44a of the plug 44. A second spring 48 is disposed in the bore 43 between the plug 44 and a piston 49 having a position which is limited at the right in FIG. 3 by a screwed stop 50 ensuring the fluid-tight closure of the assembly and permitting regulation of the overspeed threshold.

Between the bushing 40, the piston 49, and the stop 50, the free space forms a chamber 51 which will be referred to as the test control chamber and which, through radial bores 52 in the bushing 40, communicates normally with the low pressure Pca at point 34 (see FIG. 1) through a throttle 53, and can be communicated temporarily with the high pressure Pam at point 8 by means of a solenoid valve 18 controlled by a switch 19 for the purpose of testing the displacement of the piston 49, the plug 44 and the slide 21.

The operation of the modular sub-assembly just described is as follows. When the turbine engine is working it rotates the bushing 40 through its gearing 42, and the rotation of the bushing is transmitted to the slide 21 by means of the fork 31 carried by the bushing and the finger 30 rigid with the slide 21. Under normal operating conditions the chambers 26, 29, 35, 37 and 51 are subjected to the low pressure Pca, the solenoid valve 18 for test control being closed and the position of the slide-piston of the feed regulator 4, limited by the stop 16, not allowing the pressure Pam to pass to the stop control output 45 for supply to the stop valve 5 and to the intermediate chamber 35 of the pressure drop detector slide 21.

In this case the slide 21 is hydraulically balanced as the Pca low pressure prevails in its end chambers 29 and 37. The pressure drop detector 7 receives through its inlets 71 and 72 the pressures Pam and Pav respectively upstream and downstream of the flow regulator 4. When the pressure drop Pam-Pav increases, the slide 21 moves to the left and the shoulder 21f reveals to a varying extent the outlet port 73 to the chamber 26 so that the pressure Pmod decreases. Conversely, when the pressure drop Pam-Pav decreases, the slide 21 moves to the right and the shoulder 21f controls the outlet port 73 to increase the pressure Pmod.

This pressure Pmod is supplied to the control chamber of the control valve 10 and acts on the valve against the high pressure Pam, so that when Pmod decreases the valve 10 opens and allows part of the fuel delivered to point 8 upstream of the flow regulator to by-pass back to a point 11 upstream of the pump 3.

When the speed of the engine nears the overspeed threshold preset by the positioning of the stop 50, the plug 44 moves, freely at first, leftwards under the centrifugal action of the fly-weight system 33, and when the overspeed threshold is reached the plug 44 comes into contact with the slide 21. If the speed exceeds the threshold, the plug 44 pushes the slide 21 leftwards and brings about the leftward displacement of the shoulder 21f which establishes communication between the outlet port 73 and the chamber 26 at the low pressure Pca, thus decreasing the pressure Pmod and opening the control valve 10. This effects a reduction of the flow which passes through the regulator 4 to the injection system and hence limits the overspeed of the plant.

When the pilot wishes to stop the plant, he must simultaneously open the solenoid valve 17 controlling the retraction of the safety stop 16 and act upon the throttle control lever to signal the computer 13 to close the flow regulator 4 and stop the flow of injected fuel. The slide of the regulator 4 then moves fully leftwards, communicating the high pressure Pam with the stop control port 45 which thus actuates closure of the stop valve 5 and pressurizes the intermediate chamber 35 to the pressure Pam. This high pressure prevails through the radial channel 21e and the part of the axial channel 21c to the right of the throttle 39 into the chamber 37 where it acts to push the slide 21 to the left, which has the effect of reducing the control pressure Pmod to cause opening of the control valve 10 to allow the fuel flow upstream of the regulator 4 to return upstream of the pump 3.

When the engine stops or When the stop command has been cancelled, the high pressure which had been established in the chamber 37 is vented to the low pressure point 34 through the throttles 38 and 39 and the slide 21 is repositioned to the right.

To test on the ground the operation of the combined pressure drop detector and overspeed limiter sub-assembly, the high pressure Pam is communicated temporarily with the chamber 51 by opening the solenoid valve 18. The chamber 51 is then isolated from the low pressure by the throttle 53 and the pressure in the chamber 51 pushes the piston 49 to the left and effectively lowers the setting of the overspeed threshold. The pilot is then able, by opening the throttle lever to maximum, to cause the overspeed limiter to operate as described above in order to verify its working. He should verify that the rate does not exceed, under these conditions, a predefined value below the maximum rate normally authorised.

The sub-assembly described uses a hydraulic rotating slide amplifier of recognised reliability, and brings together in one modular hydraulic unit of very simple and reliable construction a pressure drop detector, an overspeed limiter, and a control for the opening of the control valve coupled with the control for stopping the flow of fuel injected. Furthermore, by incorporating into it a ground test control facility, the safety and reliability of the sub-assembly is further improved.

What is claimed is:

1. A modular control sub-assembly in a fuel control system for a turbine engine, said fuel control system comprising:

a high pressure proportioning pump for providing a supply of fuel at a pressure Pam, a feed flow regulator connected to receive fuel at said supply pressure Pam from said pump and adapted to provide an output flow at a pressure Pav for delivery to a fuel injection system, a pressure drop detector responsive to said supply and delivery pressures Pam and Pav to provide a control pressure signal Pmod dependent on the pressure drop Pam-Pav, a control valve operative on said fuel supply from said pump and responsive to said control pressure signal Pmod to control said fuel supply to said flow regulator so as to maintain said pressure drop Pam-Pav substantially constant, and an overspeed limiter adapted to be rotated by said turbine plant in proportion to the rotational speed of said plant and operative to reduce the flow of fuel to said injection system in response to the speed of said engine exceeding a present overspeed threshold, wherein said modular control sub-assembly incorporates said pressure drop detector and said overspeed limiter and said sub-assembly comprises:

a casing having a bore, a slide mounted for axial and rotational movement in said bore, said slide forming said pressure drop detector, means in said casing housing said overspeed limiter at one end of said bore in coaxial relation to said slide, and coupling means for transmitting the rotational movement of said overspeed limiter to said slide, said overspeed limiter including fly-weight means adapted to act on said slide, when said overspeed threshold is exceeded, to move said slide axially in the same direction as said slide moves when detecting an increase in said pressure drop Pam-Pav to reduce said control pressure signal Pmod and cause said control valve to open and reduce said fuel supply to said feed regulator.

2. A control sub-assembly according to claim 1, wherein said pressure drop detector slide includes a piston defining with said casing first and second control chambers communicating respectively with said pressures Pam and Pav, means defining with said casing first and second working chambers communicating respectively with said high pressure Pam and a low pressure Pca, and a shoulder separating said first and second working chambers, and wherein said casing includes an outlet for said control pressure signal Pmod, said shoulder cooperating with said outlet to communicate said outlet with either said first working chamber at said pressure Pam or said second working chamber at said pressure Pca to produce said control pressure signal Pmod when said slide moves axially in response to a decrease or increase, respectively, in the pressure drop Pam-Pav detected by said first and second control chambers, and adjustable resilient stop means against which said slide moves axially when said pressure drop increases.

3. A control sub-assembly according to claim 2, wherein said casing defines first and second end chambers receiving opposite ends of said slide, said first end chamber housing said resilient stop means and said second end chamber housing said fly-weight means of said overspeed limiter and said rotary coupling means between said overspeed limiter and said slide, and wherein said slide includes means defining, with said casing, an intermediate chamber, an axial passage opening at opposite ends into said first and second end chambers, and radial passages communicating said axial passage with said second working chamber and said intermediate chamber, said slide being hydraulically balanced when said slide is at rest between said first and second end chambers and said low pressure Pca is communicated to said second working chamber and said intermediate chamber and hence to said first and second end chambers via said axial and radial passages.

4. A control sub-assembly according to claim 3, in a fuel control system wherein said flow regulator includes a member adapted to connect said supply pressure Pam to a stop output port when said regulator assumes a nil outflow position, and wherein said intermediate chamber of said pressure drop detector slide is connected to said stop output port, and said axial channel of said slide includes a throttle between said second working chamber and said intermediate chamber, whereby said intermediate chamber is subjected to said high pressure Pam when said regulator is closed and said slide is moved axially towards a position where the control pressure Pmod is reduced and opens said control valve.

5. A control sub-assembly according to claim 3, wherein said casing has a further bore disposed on the opposite side of said second end chamber from said pressure drop detector slide and coaxial therewith, and said overspeed limiter comprises a bushing disposed in said further bore, and a plug slidable in said bushing and facing the end of said slide in said second end chamber, said bushing supporting gearing adapted to be driven by a shaft of said turbine plant and said fly-weight means in said second end chamber, and said fly-weight means including a support member carried by said bushing and having a fork forming a part of said coupling means for rotating said slide, and levers attached to said fly-weights and operative to cause displacement of said plug towards said slide when the speed of said turbine engine increases whereby, when said overspeed threshold is reached, said plug engages and pushes said slide axially in a direction which reduces said control pressure signal Pmod to open said control valve and thereby limit the overspeed.

6. A control sub-assembly according to claim 5, wherein said overspeed limiter includes a first spring mounted between said support member of said fly-weights and a face of said plug to act in opposition to said fly-weight levers, a piston disposed in said bushing, a second spring disposed in said bushing between said plug and said piston, and a stop limiting the position of said piston in said bushing.

7. A control sub-assembly according to claim 6, wherein a test control chamber is defined between said bushing, said piston, and said adjustment stop, and said test control chamber is connected to said low pressure Pca through a throttle, and wherein means including a solenoid valve are provided for temporarily supplying fluid at said high pressure Pam to said test control chamber to alter the forces determining the axial equilibrium position of said plug so as to displace said position axially towards said slide whereby said plug will engage and displace said slide at a predetermined rotational speed below the normally set overspeed threshold.

* * * * *

UNITED STATES PATENT AND TRADEMARK OFFICE
CERTIFICATE OF CORRECTION

PATENT NO. : 4,817,376

DATED : APRIL 4, 1989

INVENTOR(S) : JEAN-MARIE BROCARD et al

It is certified that error appears in the above-identified patent and that said Letters Patent is hereby corrected as shown below:

In column 3, line 42, change "engine The" to --engine. The--.

In column 5, line 28, change "add" to --and--.

In column 6, line 48, change "When" to --when--.

In column 7, line 12, change "pump-" to --pump--; and line 54, change "includes" to --includes:--.

Signed and Sealed this

Third Day of July, 1990

*Attest:*

HARRY F. MANBECK, JR.

*Attesting Officer*      *Commissioner of Patents and Trademarks*